March 16, 1965  R. J. O'NEILL  3,174,144
DIGITAL READ-OUT AND DISPLAY UNIT
Filed Nov. 21, 1960  3 Sheets-Sheet 1
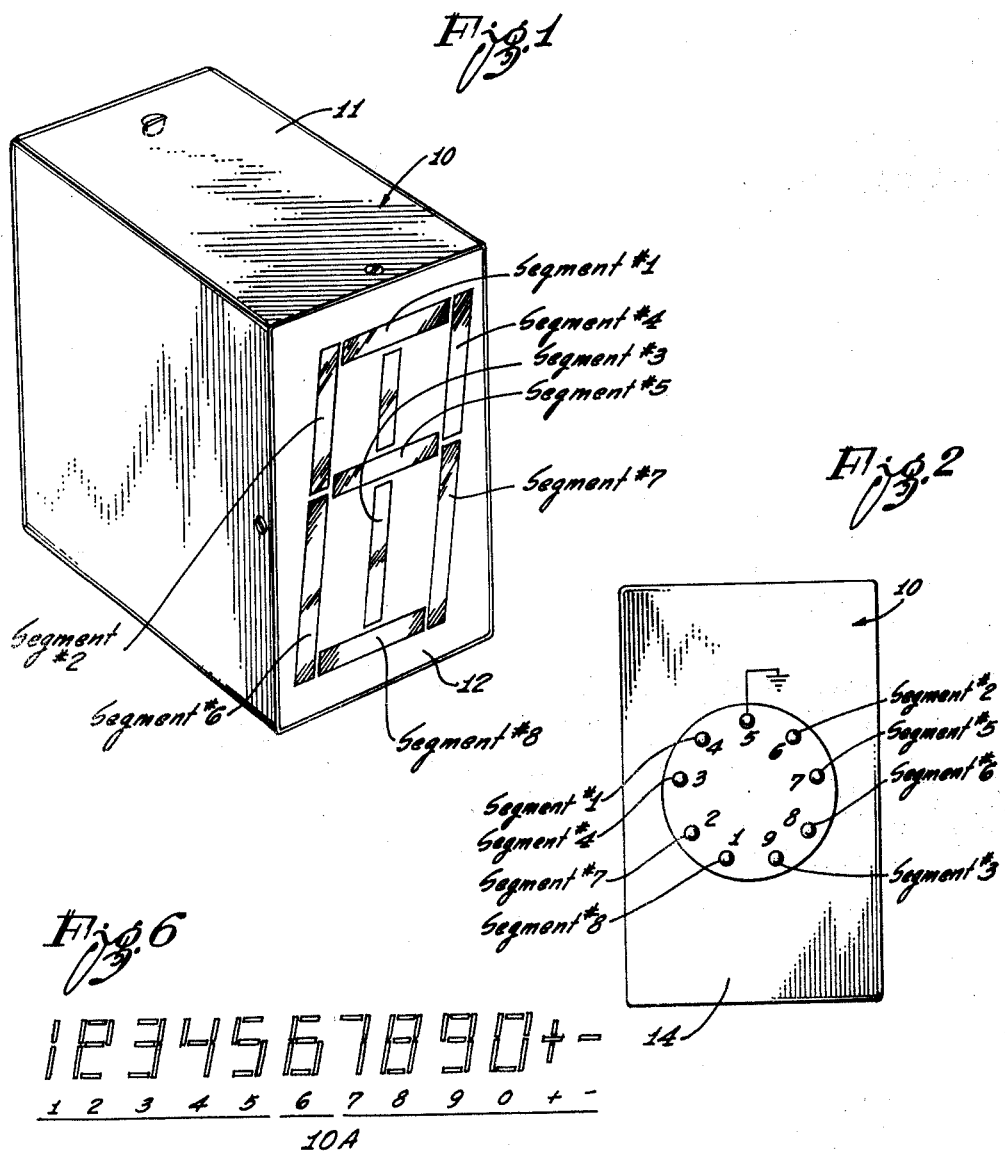

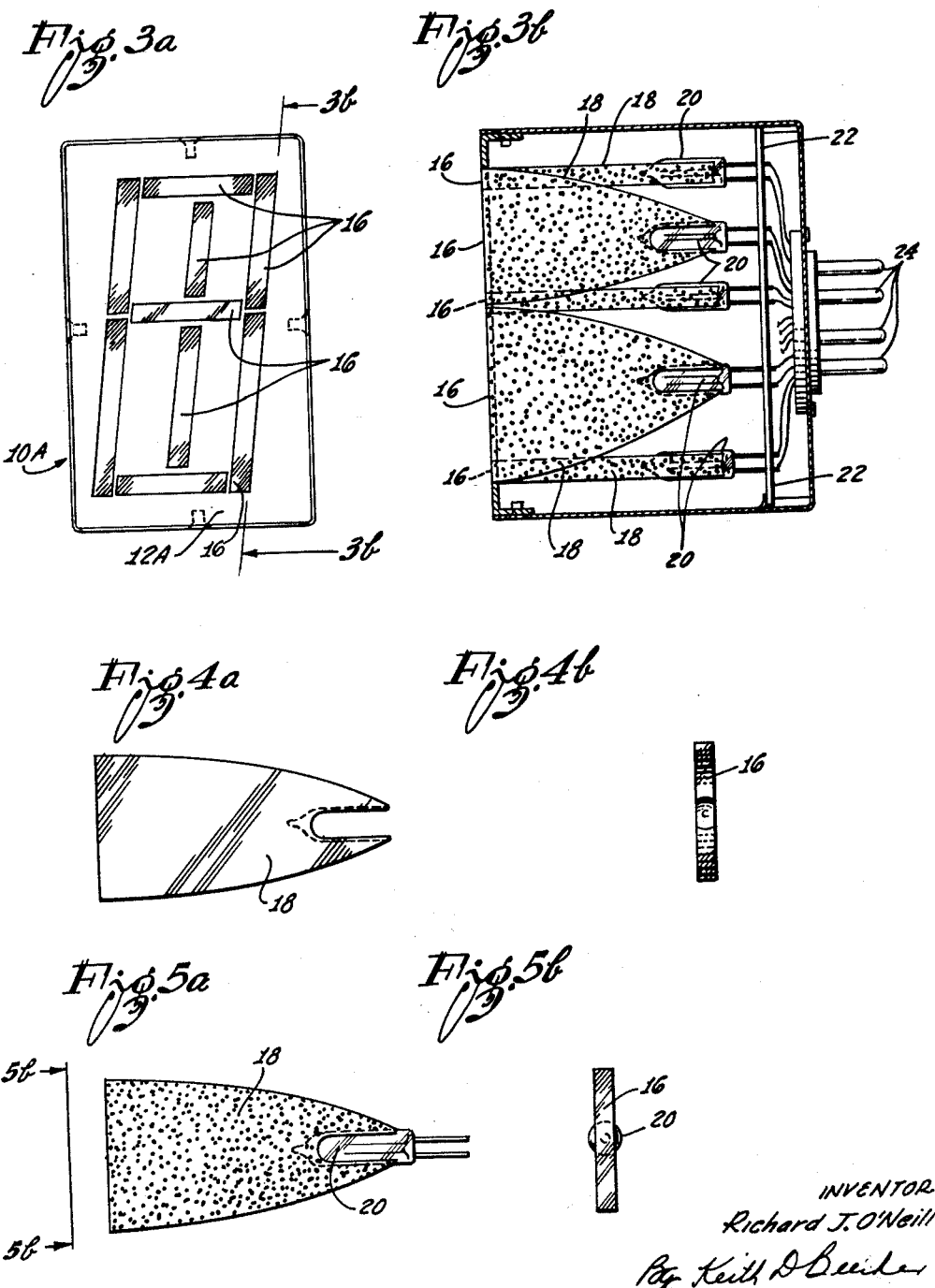

March 16, 1965  R. J. O'NEILL  3,174,144
DIGITAL READ-OUT AND DISPLAY UNIT

Filed Nov. 21, 1960  3 Sheets-Sheet 3

INVENTOR:
Richard J. O'Neill
By Keith D. Beecher
Attorney

United States Patent Office 3,174,144
Patented Mar. 16, 1965

3,174,144
DIGITAL READ-OUT AND DISPLAY UNIT
Richard J. O'Neill, 5301 Melvin Ave., Tarzana, Calif.
Filed Nov. 21, 1960, Ser. No. 70,594
2 Claims. (Cl. 340—324)

The present invention relates to read-out units, and it relates more particularly to an improved digital read-out and display unit by which numeric or alphanumeric read-out is accomplished through the use of segments on a display surface which, when lighted, may give a visual reading of numbers, letters, or any other desired insignia.

Digital read-out and display units are presently in wide spread use. These units usually include a plurality of input terminals, and a corresponding plurality of miniature electric lamps, or other luminating means. The usual prior art unit responds to exciting voltages applied to different ones of its input terminals to cause different numbers or letters to appear on its display surface. An appropriate diode or resistor matrix unit is interposed between the read-out unit and the signal source, and the matrix serves to transform the signals into appropriate voltages for the read-out display unit. In this manner, the actual output signals from the signal source are transformed by the read-out display unit into the numbers or letters they are intended to represent.

Typical applications for digital read-out display units of the type described in the preceding paragraph include, for example, computers, counter read-outs, annunciator boards, digital voltmeters, aircraft instrumentation, visual channel indication on television sets, clocks, displays, and so on.

It is an object of the present invention to provide a digital read-out display unit of a new and improved type which is so conceived and constructed that the characters displayed on its display surface are well defined and easy to read, even under conditions of high ambient light and from angles up to practically 180° with respect to the display surface.

Another object of the invention is to provide such an improved digital read-out display unit which is capable of withstanding high shocks and vibrations.

A further object of the invention is to provide such an improved digital read-out unit which may be constructed to have a relatively small depth so as to occupy a minimum space.

A still further object of the invention is to provide such an improved digital read-out and display unit which is relatively simple to construct and which can be sold at a relatively low cost.

The read-out and display unit of the invention is advantageous in that the unit may be completely sealed. In addition, the read-out unit of the invention may be constructed to be a plug-in type so that it may be conveniently detachable for repair or replacement purposes. Standard tube sockets and connections can be used in the unit for convenience and economy purposes.

The construction of the present invention has many features, including the fact that no front glass is required so that reflections are eliminated; all the characters and numbers appear on the display surface of the unit in a single plane for true in-line presentation with accurate reading being possible at angles approximating 180° with respect to the display surface; the characters appear sharp, bright and clear on the display surface due to the action of the internal lenses in transmitting the light from the corresponding lamps directly to the display surface.

An additional feature of the digital read-out and display unit of the invention is the formation in the embodiment to be described of a mirrored surface over the individual lenses, this surface serving to concentrate the light from the lamp at the display surface so that a high degree of brilliance may be attained.

Another feature of the invention is the provision of such a digital read-out unit which is so constituted that long lamp life can be expected due to the efficient light concentration permitting lower exciting voltages and resulting currents to be used.

Yet another feature of the invention is the provision of a sealed housing and bulb-lens combination so that there is no loss or brilliance with age in the lenses or reflected surfaces.

The objects, advantages and features of the invention will become more apparent from a consideration of the following description, when taken in conjunction with the accompanying drawings in which:

FIGURE 1 is a front perspective view of a digital read-out display unit which may be constructed to incorporate the concepts of the present invention;

FIGURE 2 is a rear view of the unit of FIGURE 1, and this latter view serves to illustrate the manner in which the terminal connections to the unit may be brought out through a standard tube plug and socket combination;

FIGURE 3a is a front view of a unit which may be constructed to incorporate the invention, this view illustrating the manner in which the front edge of the individual lenses in the unit extend to the plane of the display surface to form segments which may be synthesized into desired numbers or letters;

FIGURE 3b is a side sectional view, substantially on the line 3b—3b of FIGURE 3a, the latter view showing the manner in which the lens-bulb combinations are positioned in the housing of the display unit;

FIGURE 4a is a side view of a typical lens which may be used in the combination of the invention;

FIGURE 4b is an end view of the lens of FIGURE 4a;

FIGURE 5a is a side view of a lens-bulb combination, with the lens and bulb being coated by a reflective coating so that all the light from the bulb may be concentrated at the front edge of the lens;

FIGURE 5b is an end view of the lens-bulb assembly of FIGURE 5a;

FIGURE 6 shows the different numbers which can be displayed on the display surface of the unit of FIGURES 3a and 3b;

Figure 7:
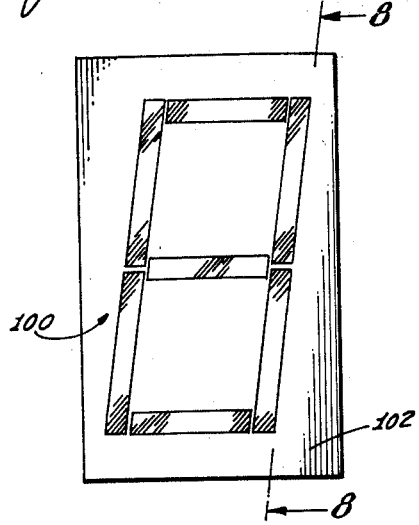
FIGURE 7 is a front view of a modification of the invention.

The digital read-out and display unit 10 of FIGURES 1 and 2 includes a casing 11 which has a front display surface 12 and which has a rear surface 14. A plurality of miniature electric bulbs are included in the casing 10, as will be described, and each bulb has a lens mounted on it to form a lens-bulb combination. The forward edges of these lenses are referred to as segments in FIGURE 1, and they form a particular pattern on the display surface 12. The selective illumination of these segments permits, for example, any number from 1 through 0 to be reproduced (as shown in FIGURE 6), as well as the signs + and —. It is also apparent that most letters of the alphabet can be reproduced by the selective illumination of the segments, and that all letters could be reproduced by providing other designs and patterns. The segments in FIGURE 1 are designated as segments #1–#8. The characters are preferably sloped slightly, for example about 5° to the vertical, as shown in FIGURES 1 and 6, for improved ease of reading.

As illustrated in FIGURE 2, the terminals from the display unit 10 extend from the rear surface 14, and are arranged similar to the pins of a vacuum tube. This, as noted above, permits the unit to be mounted in a standard tube socket. The pins in FIGURE 2 are numbered 1 through 9. These pins are connected to the different lamps associated with respective ones of the segments, as indicated; and the pin #5 being grounded.

By way of example, it may be pointed out that a typical constructed unit may have a width of one inch, a heighth of 1½ inches, and a depth of 1½ inches. The characters displayed on the display surface 12 may have a heighth of 1.150 inches, a width of .550 inches, whereas the width of the actual segments may be of the order of .060 inch.

Appropriate lamps for use in the unit may be, for example, General Electric neon lamps presently designated by them Ne24. These lamps require 110-125 volts A.C., or 150-200 volts D.C. and consume power of the order of 2 watts. If desired, filament lamps of the 4-25 volt A.C. type may be used in the unit, and such lamps usually consume a total power of from 5 to 15 watts. When neon lamps are used in the unit, a resistor matrix is used to transform the output signals into appropriate voltage combinations for the unit; and when filament lamps are used, a diode matrix is substituted for the resistor matrix.

As shown in FIGURE 3a, the front face 12a of a digital read-out and display unit 10a, similar to the unit described above, includes a plurality of segments 16. These segments are actually the forward edge of a corresponding plurality of lenses 18 which are housed in the casing of the read-out unit. The lenses 18 are supported within the unit so that their forward edges extend to the display surface 12a. In addition, the lenses are supported so that their forward edges 16 may form the pattern illustrated in FIGURE 3a. As mentioned above, the selected energizing of a plurality of neon lamps 20 associated with the lenses 18 causes the illuminated segments 16 to provide any desired numeric or alphanumeric indication, such as shown in FIGURE 6.

As shown in FIGURE 3b, for example, the leads from the lamps 20 are connected to a printed circuit board 22, and appropriate connections are made from the board to a plurality of pins 24. As mentioned previously, the pins 24 may be arranged in a circle, so that the unit 10a may be used with a usual tube socket.

The lens-bulb combinations of FIGURE 3b may be conveniently mounted in the casing of the unit 10a by first supporting the lens-lamp combinations in an appropriate jig, and inserting the jig in the casing. The casing is then filled with a filler of appropriate molding, potting material, and when the filler hardens, the lens-bulb combinations are rigidly supported in place in the casing. This filler also serves to prevent any light from the lens-bulb combinations from escaping through the casing, so that all available light is directed to the forward edge 16 of the lenses 18. As noted above, this molded construction also serves to prevent any adverse aging effects on the properties of the lenses 18.

As shown in FIGURES 4a and 4b, the lenses 18 are each shaped to form an internal-reflecting lens, so that all light introduced through a rear edge of the lens by a lamp 20 is transmitted to the forward edge 16 due to the internal reflective properties of the lens. The lens may be formed of a clear material, such as Plexiglas, or of any other suitable known lens material. The bulb 20 is inserted into a slot in the rear of the lens, and it is supported in the slot so that its light may be transmitted by the lens to the front edge 16.

The whole lamp-lens assembly 18-20 may be coated with a highly reflected material. For example, a mirror metallic surface can be formed on the surface of the lamp-lens assembly 18-20 by any known vacuum deposition process. However, other reflective substances, such as white paint, etc., may be used. This reflective coating, together with the reflective properties of the lens itself, assure that essentially all the light from the tube 20 will be transmitted to the forward edge 16. As noted, the filler in the casing of the unit is a molding material which will not pass light, and this factor also assures that a maximum amount of light is transmitted to the front edge 16 of each of the lenses 18.

Figure 8:
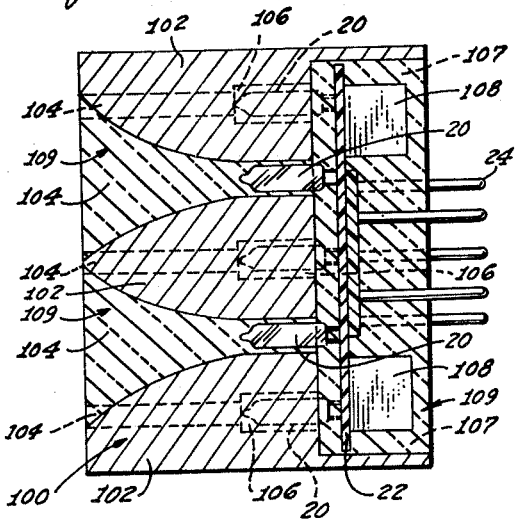
FIGURE 8 is a sectional view substantially on the line 8—8 of FIGURE 7.

In the embodiment of FIGURES 7 and 8, the read-out and display unit 100 is formed of an integral block 102 which may be formed of any suitable material and which may be molded, cast or otherwise formed. In this embodiment cavities 104 are molded or cast directly in the block of the proper shape to encase the lenses to be formed therein. Further cavities 106 are also molded, cast or otherwise formed in the block 102 and in communication with the cavities 104. These latter cavities are of a size and shape to receive the bulbs 20 described above.

In like manner, a cavity 107 is formed in the rear portion of the block 100 in communication with the cavities 106, and of a size and shape to receive the printed circuit board 22 and the pins 24. Appropriate matrix units 108 can also be mounted on the printed circuit board 22 and disposed in the cavity 106.

The cavities 104 and 106 can be coated with a highly reflective material, and the bulbs 20 assembled with their printed circuit board 22 and pins 24 in the cavities 106 and 107. Then a clear potting material such as Plexiglas, or any other suitable known material, can be poured or cast into the unit to fill the cavities. This potting material 109 produces the lenses and provides a rugged assembly in one operation.

The assembly of FIGURES 7 and 8 functions in the same manner as the previously described embodiments, and it achieves the same resulting lens action as that described above. The latter assembly is illustrative of yet another embodiment of the invention that is instrumental in achieving the desired results of the invention.

The invention provides, therefore, an improved digital read-out and display unit, in which the various characters are formed by illuminated segments which are arranged at a display surface. The improved display unit of the invention is advantageous in that internal lens systems are provided to transmit all the available light directly to the display surface.

I claim:

1. A digital read-out display unit including: electric lamps, a casing having a front display surface and having a rear surface; a plurality of internally reflective diverging lenses positioned in said casing, each of said lenses having a substantially rectangular forward edge disposed at said front display surface of said casing to form elongated rectangular segments on said front display surface in a particular pattern, each of said diverging lenses having a rectangular cross-section which decreases in cross section in a rearwardly extending direction from said front display surface of said casing to a position adjacent the rear surface thereof, and each of said lenses diverging from a rear edge towards the aforesaid forward edge thereof, said rear edge having an outline of small length as compared with the length of the corresponding forward edge, said rear edge having a surface recessed towards said rectangular forward edge for reception of an electric lamp, a corresponding plurality of said electric lamps mounted in the recessed rear surfaces of respective ones of said lenses and being operative to introduce light selectively to said lenses to be transmitted therethrough to the corresponding forward edges due to the internally reflective properties of said lenses; and means connected to individual ones of said electric lamps for providing selective electrical energization of said lamps.

2. The digital read-out display unit defined in claim 1 in which said casing is in the form of a block having cavities therein, and in which said lenses are formed by a transparent potting material filling said cavity.

References Cited by the Examiner

UNITED STATES PATENTS

| | | | |
|---|---|---|---|
| 2,142,106 | 1/39 | Boswau | 340—324 X |
| 2,448,244 | 8/48 | Arnold. | |
| 2,589,569 | 3/52 | Peter | 88—1 XR |
| 2,751,584 | 6/56 | Isborn | 340—380 |
| 2,765,458 | 10/56 | Hoover | 88—1 |
| 2,932,820 | 4/60 | Boomer et al. | 340—380 |
| 2,998,597 | 8/61 | Edwards | 340—378 |
| 3,062,441 | 11/62 | Martin | 340—380 |
| 3,081,450 | 3/63 | Sinninger | 340—336 |
| 3,129,421 | 4/64 | Freedman | 340—378 |

NEIL C. READ, *Primary Examiner*.

JOHN F. BURNS, ROBERT H. ROSE, *Examiners*.